United States Patent [19]
Kawabata

[11] Patent Number: 5,080,391
[45] Date of Patent: Jan. 14, 1992

[54] VEHICULAR HEIGHT REGULATION SYSTEM FOR AUTOMOTIVE VEHICLE WITH ACTIVE FLUID PRESSURE WITHIN PREDETERMINED VARIATION RANGE

[75] Inventor: Kazunobu Kawabata, Kanagawa, Japan

[73] Assignee: Nissan Motor Company, Limited, Yokohama, Japan

[21] Appl. No.: 530,573

[22] Filed: May 30, 1990

[30] Foreign Application Priority Data

May 30, 1989 [JP] Japan ................... 1-136729

[51] Int. Cl.$^5$ ............................................. B60G 11/26
[52] U.S. Cl. ................... 280/707; 280/840; 280/714; 280/DIG. 1
[58] Field of Search .......... 280/840, 6.12, 707, 280/714, DIG. 1

[56] References Cited

U.S. PATENT DOCUMENTS

| | | | |
|---|---|---|---|
| 4,624,476 | 11/1986 | Tanaka et al. | 280/707 |
| 4,695,074 | 9/1987 | Kobayashi et al. | 280/707 |
| 4,787,644 | 11/1988 | Yokote et al. | 280/DIG. 1 |
| 4,911,468 | 3/1990 | Fukunaga | 280/DIG. 1 |
| 4,911,469 | 3/1990 | Kawarasaki | 280/DIG. 1 |

*Primary Examiner*—Kenneth R. Rice
*Attorney, Agent, or Firm*—Foley & Lardner

[57] ABSTRACT

A height regulation system for an automotive vehicle to generally adjust a vehicular height level within a predetermined height range includes a variable pressure chamber, in which the fluid pressure is adjusted to adjust the relative distance between the vehicular body and a vehicular wheel. The system includes a control circuit including a sensor for monitoring vehicular height for detecting an actual vehicular height beyond the predetermined height range for triggering height adjustment operation. The control circuit limits the variation range of the fluid pressure within a predetermined range so as to avoid excess adjustment of the pressure at any vehicular condition.

6 Claims, 5 Drawing Sheets

VEHICULAR HEIGHT REGULATION SYSTEM FOR AUTOMOTIVE VEHICLE WITH ACTIVE FLUID PRESSURE WITHIN PREDETERMINED VARIATION RANGE

BACKGROUND OF THE INVENTION

1. Field of the Invention

The present invention relates generally to a height regulation system for an automotive vehicle for regulating the height of a vehicle body to provide an appropriate height for the vehicle. More specifically, the invention relates to a height regulation system, which limits the variation range of fluid pressure which is active for height adjustment to a predetermined pressure range so as to avoid the fluid pressure being excessively high or low.

2. Description of the Background Art

In general, a vehicular height regulation system adjusts the height of a vehicular body so that the vehicular body height can be maintained within a predetermined height range. The height regulation system includes a fluid actuator having a working chamber, in which fluid pressure is adjusted in order to adjust the relative distance between a vehicular wheel and the vehicular body. A height sensor is provided for monitoring the relative distance between the vehicular wheel and the vehicular body so as to detect the relative distance beyound a predetermined range. When the height sensor detects the relative distance between the vehicular wheel and the vehicular body being beyond the predetermined range, height adjustment is initiated to adjust the fluid pressure in the fluid actuator so that the relative distance can be adjusted within a predetermined height range.

In such a height regulation system, when the vehicular body is raised for maintenance, repair or for other causes, by means of a jack or so forth, height adjustment should be effective. However, if the height regulation system is maintained in an active state, a continous height adjustment command will be output for reducing the relative distance between the vehicular wheel and the vehicular body. As a result, the fluid pressure in the working chamber can become excessively low. Therefore, when the vehicle is returned to the ground and released from the lifting tool, e.g. jack, the vehicular height becomes so excessively low as to require height adjustment to increase the relative distance between the vehicular wheel and the vehicular body.

In the prior art, there is a proposal to disable the height adjustment when the vehicular height, i.e. relative distance between the vehicular wheel and the vehicular body, is maintained even after a height adjustment operation for a predetermined period of time. This proposal is found in Japanese Utility Model First (unexamined) Publication (Jikkai) Showa 61-10219.

Such a prior art proposal may be effective in a certain respect to avoid height adjustment operation while height adjustment a not be in effect. However, a drawback may be encountered by a delay of judgement for the ineffective state of the height adjustment. Namely, in the proposed system, judgement that the height adjustment is not effective can be made only after a height adjustment operation for a predetermined period of time. Namely, during the predetermined period of time, in which the height adjustment is active, the fluid pressure in the working chamber of the fluid actuator can be varied excessively to cause the vehicular height to be beyound the predetermined height range when the vehicle returns to the normal state.

SUMMARY OF THE INVENTION

Therefore, it is an object of the present invention to provide a height regulation system which can solve the drawback in the prior art and can to be beyond resume vehicular height within a predetermined height range when a vehicle is returned to normal state after a state in which height adjustment should not be effective.

In order to accomplish the aforementioned and other objects, a height regulation system for an automotive vehicle, according to the present invention, generally adjusts a vehicular height level within a predetermined height range. The system includes a variable pressure chamber, in which the fluid pressure is varied to adjust the relative distance between the vehicular body and a vehicular wheel. The system includes a control circuit. The control circuit is connected to a sensor for monitoring vehicular height for detecting the actual vehicular height and the predetermined height range. The control circuit executes the height adjustment operation. The control circuit limits the variation range of the fluid pressure within a predetermined range so as to avoid excess adjustment of the pressure at any vehicular attitude and height condition.

According to one aspect of the invention, a vehicular height regulation system comprises:

–a height adjusting unit disposed between a vehicular body and a vehicular wheel for adjusting the relative distance therebetween, the height adjusting unit including a variable pressure chamber filled with a working fluid with variable pressure;

– a pressure adjusting unit for adjusting the fluid pressure within the variable pressure chamber for varying the relative distance between the vehicular body and the vehicular wheel;

a sensor for monitoring relative distance between the vehicular body and the vehicular wheel to produce a sensor signal representative of the monitored relative distance;

a control unit for deriving a control signal on the basis of the sensor signal value to control operation of the pressure adjusting unit for maintaining the relative distance between the vehicular body and the vehicular wheel within a predetermined distance range, the control unit limiting the variation range of the fluid pressure within the variable pressure chamber within a predetermined pressure range.

According to another aspect of the invention, a vehicular height regulating system for an automotive vehicle comprises a first unit, including a plurality of hydraulic pressure actuators, each installed between a vehicular body and one of the road wheel supporting members, for varying a relative distance between the vehicular body and the corresponding one of the wheel supporting members according to a working hydraulic pressure applied thereto;

a pressure control valve unit for controlling the working hydraulic presure applied to the associated one of the hydraulic pressure actuators according to a value of a command signal input thereto;

a sensor unit for detecting a relative distance between the vehicular body and a corresponding one of the supporting members;

a first control unit for providing the command signal for the pressure control valve unit whose value is varied according to the detected relative distance so as to provide an appropriate vehicular height, the first control unit determining whether the detected relative distance falls within a predetermined controllable range and providing the command signal for the pressure control valve unit so that the relative distance falls within the predetermined controllable range when it is determined that the detected vehicular height does not fall within the predetermined controllable range; and a second control unit for providing both maximum and minimum limits for the values of the command signals so that the working fluid pressures of the respective hydraulic pressure actuators fall within a predetermined pressure range defined by the maximum and minimum limits.

Preferably, the predetermined distance range is set with respect to a predetermined target vehicular height and the predetermined pressure range is defined by a lower pressure limit corresponding to the fluid pressure required for maintaining the relative distance for establishing the target height at minimum load condition of the vehicular body and an upper pressure limit corresponding to the fluid pressure required for maintaining the relative distance for establishing the target height at a maximum load condition.

BRIEF DESCRIPTION OF THE DRAWINGS

The present invention will be understood more fully from the detailed description given herebelow and from the accompanying drawings fo the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
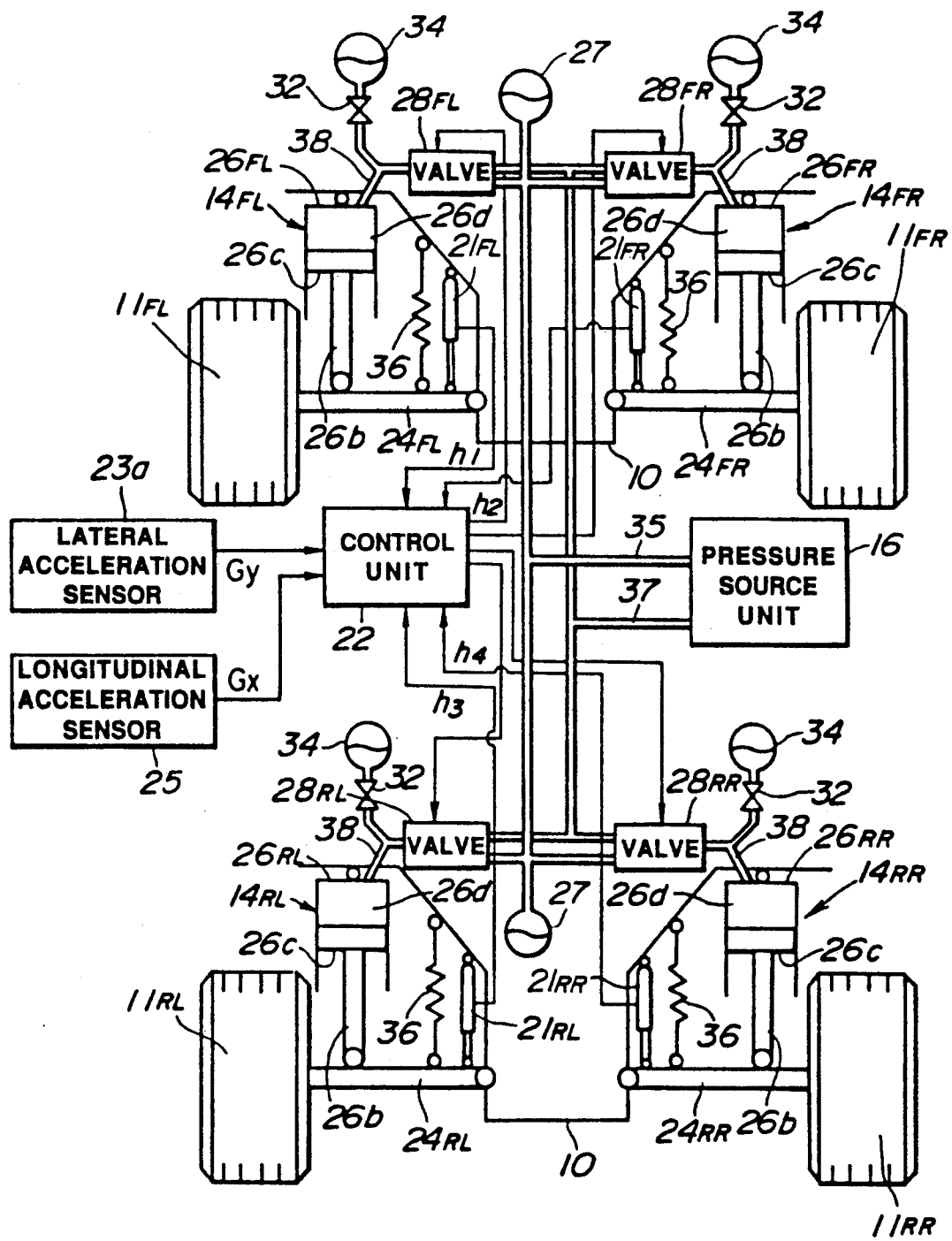
FIG. 1 is a diagrammatical illustration of the overall construction of the preferred embodiment of a height regulation system, according to the present invention.

Referring now to the drawings, particularly to FIG. 1, the preferred embodiment of a height control system, according to the present invention, constitutes an active suspension system which is designed to generally perform suspension control for regulating vehicular height level and vehicular attitude by suppressing relative displacement between a vehicular body 10 and road wheel supporting members 24FL, 24FR, 24RL and 24RR. Front-left, front-right, rear-left and rear-right suspension mechanisms 14FL, 14FR, 14RL and 14RR are mounted between the vehicular body 10 and road wheel supporting members 24FL, 24FR, 24RL, and 24RR. Front-left, front-right, rear-left and rear-right wheels 11FL, 11FR, 11RL and 11RR are rotatably supported on the roadwheel supporting members 24FL, 24FR, 24RL, and 24RR.

It should be appreciated that although the specific embodiment is directed to the particular embodiment associated with a hydraulic active suspension system which performs not only height regulating operation but also vehicular attitude change suppressing operation, bouncing control operation and so forth, the technology proposed by the present invention is also applicable for any type of height regulating systems, such as a pneumatic height regulation system and so forth.

The road supporting member will be hereafter represented by the reference numeral 24 as generally referred to. Similarly, the suspension mechanism as generally referred to will be hereafter represented by the reference numeral 14. Respective front-left, front-right, rear-left and rear-right suspension mechanisms 14FL, 14FR, 14RL and 14RR have hydraulic cylinders 26FL, 26FR, 26RL and 26RR which will be represented by the reference numberal 26 as generally referred to.

Each of the hydraulic cylinders 26 is disposed between the vehicular body 10 and the road wheel supporting member 24 to produce a damping force for suppressing relative displacement between the vehicular body 10 and the road wheel supporting member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be commucation with the reference pressure chamber 26e via an orifice formed through the piston for fluid communication therebetween in an substantially restricted amount. The piston 26c is connected to the associated one of supporting members 24 via a piston rod 26b. A suspension coil spring 36 employed in the type of the supporting system shown is not required to have a resilient force in a magnitude required in the ordinary suspension system and is only required to have a resilient force necessary for maintaining the vehicular body about the supporting member.

The working chamber 26d of the hydraulic cylinder 26 is connected to one of the pressure control valves 28FL, 28FR, 28RL and 28RR via a pressure control line 38. The pressure control valve 28FL, 28FR, 28RL and 28RR will be hereafter represented by the reference numeral 28 as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 27 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected a plurality of vehicular height sensors 21FL, 21FR, 21RL and 21RR which are disposed in a respectively associated supension mechanism and designed for monitoring relative distance of the vehicular body 10 with respect to the relevant road wheel supporting member 24 to produce a vehicular height level indicative signals $S_{FL}$, $S_{FR}$, $S_{RL}$ and $S_{RR}$. The stroke sensor as generally referred to will be represented by the reference numeral 21. The control unit 22 is also connected to a lateral acceleration sensor 23a, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor 23a, a longitudinal aceleration indicative signal $G_x$ generated by the longitudinal acceleration sensor 25, and so forth, the control unit 2 performs anti-rolling, anti-pitching and bouncing suppressive suspension controls.

While specific sensors are disclosed, such as the vehicle height sensors which comprise the stroke sensor, the lateral acceleration sensor 23a and the longitudinal acceleration sensor 25, it is possible to replace any of these with or add any other sensor which monitors a vehicle driving parameter associated with the suspension control. For instance, the stroke sensors employed in the embodiment shown can be replaced with one or more vertical acceleration sensors. Similarly, the lateral acceleration senso may be replaced with a steering angle sensor for mointoring steering behaviour by assuming a lateral force to be exerted on the vehicular body. In the later case, the parameter indicative of the steering angular displacement may be used in combination with vehicular speed data since vehicular speed may influence the rolling magnitude of the vehicle during a steering operation.

Figure 2:
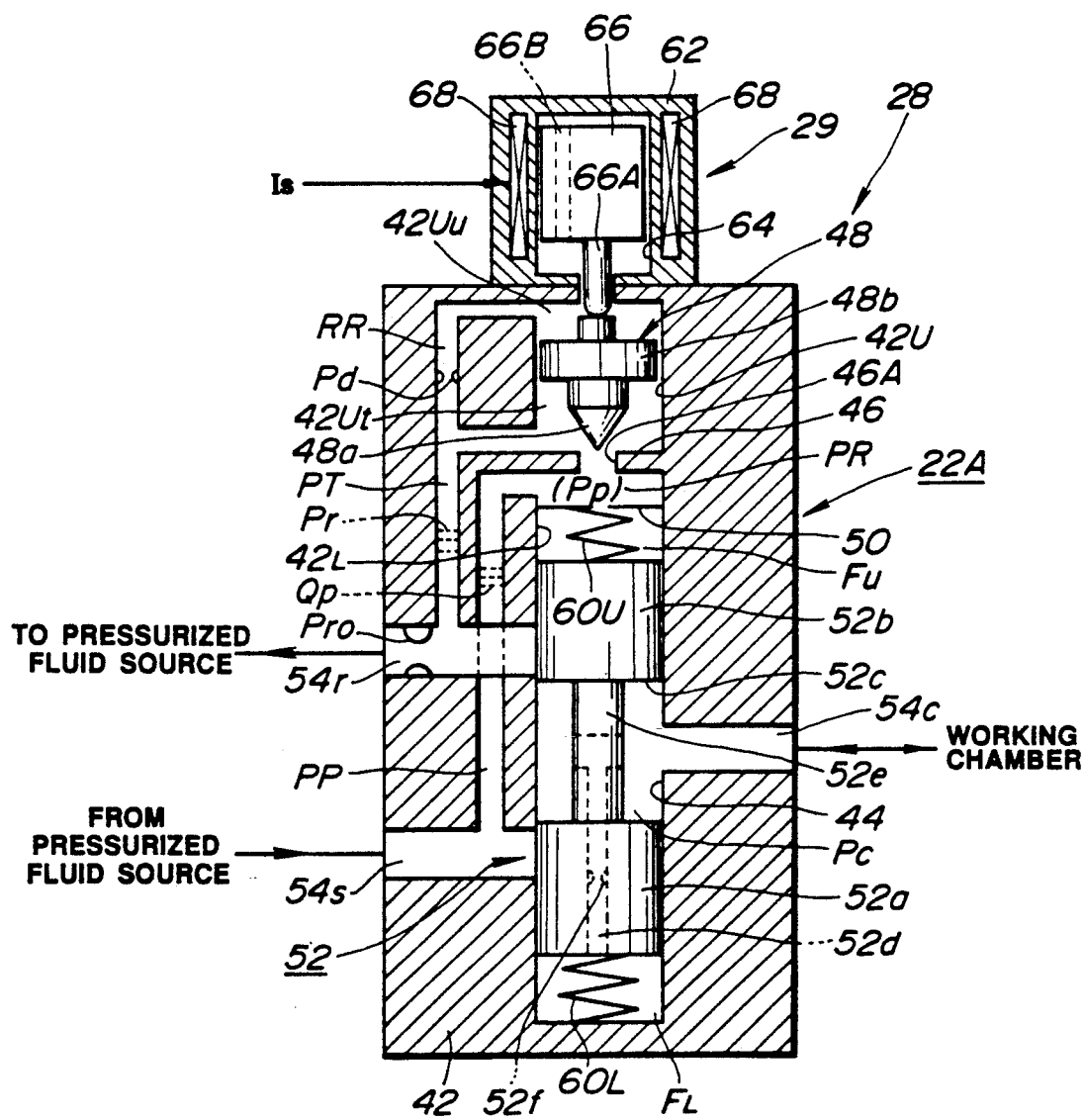
FIG. 2 is a sectional view of the preferred embodiment of the pressure control valve employed in the preferred embodiment of the height regulation system of FIG. 1.

As shown in FIG. 2 in detail, the pressure control valve 26 comprises a proportioning valve assembly and is designed to controlled by an electric current as a control signal supplied from the control unit 22 for varying the valve position according to variation of the current value of the control signal. Generally, the pressure control valve 28 controls the magnitude of introduction and draining of pressurized fluid into and from the working chamber 26d for adjusting the pressure in the working chamber. As will be appreciated, the adjusted fluid pressure in the working fluid determines the damping force to be created in response to relative displacement between the vehicle body 10 and the suspension supporting member 24. The mode of the suspension mechanism is varied according to variation of the fluid pressure in the working chamber between a predetermined hardest mode to a softest mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exert spring force on the valve spool 52 for resiliently restricting movement of the latter. The resilient forces of the offset springs 60U and 60L are so set as to balance to place the valve spool 52 at a neutral position, when the fluid pressure in the upper and lower feedback chambers FU and FL balances each other. The valve chamber 42L communicates with a supply line 35 via a supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26, is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end in communication with the pressure control chamber PC and the other end in communication with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 40 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ut. The upper and lower sections 42Uu and 42Ul are with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifices oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the embodiment shown serves to provide greater fluid flow restriction against non-steady or disturbed fluid flow than that for the steady flow. As seen from FIG. 2, the multi-stage orifice Pr is provided upstream of the upper and lower sections 42Uu and 42Uc. On the other hand, a fixed throttling orifice Pd is provided at an orientation downstream of the lower section 42Ut and upstream of the upper section 42Uu. Similarly, the pilot chamber PR is communicated with the supply port 54s via a pilot path PP. A multi-stage orifice Qp which has a similar construction and flow restricting function to that of the multi-stage orifice Pr is provided in the pilot path pp.

A fixed throttle orifice Pro is also provided in the drain port 54r for restricting fluid flow therethrough. The diameter of the fluid path at the orifice Pro is so selected as to create a great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
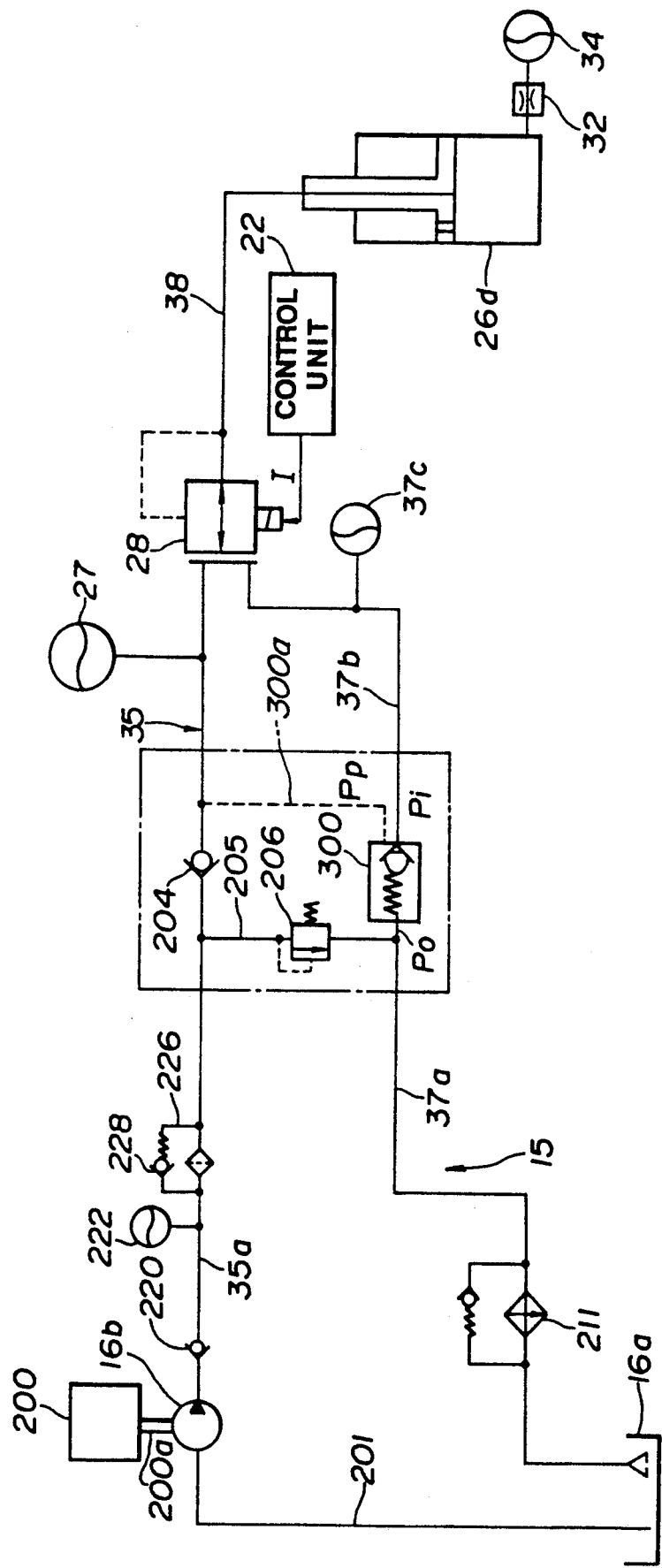
FIG. 3 is a circuit diagram of one example of hydraulic circuit which is applicable for the preferred embodiment of the height regulation system of FIG. 1.

FIG. 3 shows detailed circuit construction of one example of hydraulic circuit which is applicable for the embodiment shown of the active suspension system, according to the present invention. The hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply port 54s of the pressure control valve 28 via the supply line 35. An one-way check valve 220, a pressure accumulator 222 for absorbing pulsatile fluid flow, and, a filter 224 are disposed in a portion 35a of the supply line 35. A by-pass passage 226 with an one-way check valve 228 is provided for by-passing the filter 224.

Pressure accumulators 27 are also connected to the supply line 35 to receive therefrom the pressurized fluid for accumulating the pressure. An one-way check valve 204 is disposed in the supply line 35 at the position upstream of the junction between the pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

On the other hand, an operational one-way check valve 300 is disposed between the sections 37a and 37b of the drain line 37. The operational one-way check valve 300 is also connected to the supply line 35 downstream of the one-way check valve 204 to receive therefrom the pressure in the supply line as a pilot pressure, via a pilot line 300a. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into a shut-off position. At the shut-off position, the operational one-way check valve 300 blocks fluid communication between the drain port 54r of the pressure control valve 28 and the reservoir tank 16a. In the embodiment shown, the predetermined pressure is set at a pressure corresponding to the neutral pressure of the pressure control valve unit 28.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

Figure 4:
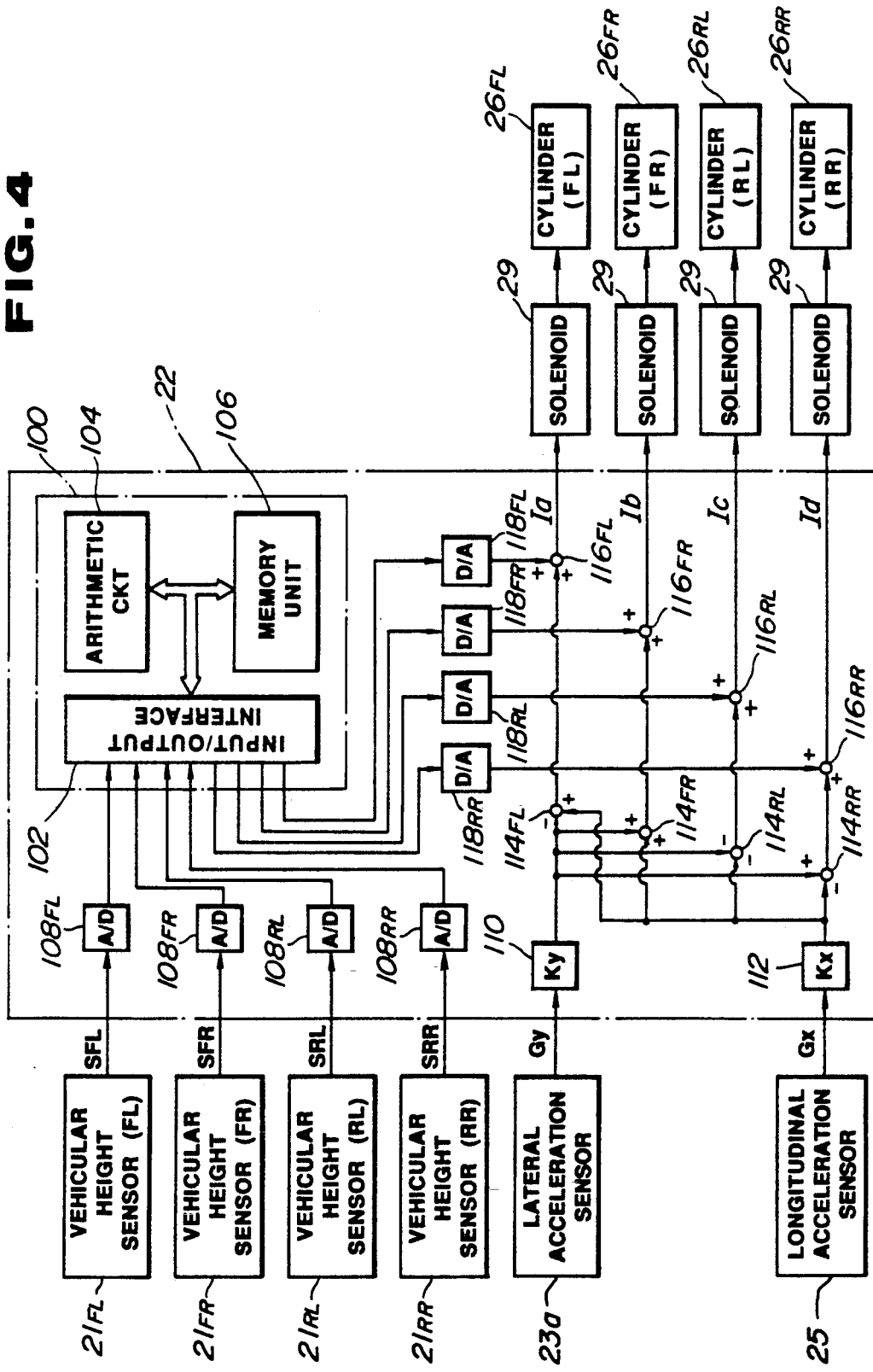
FIG. 4 is a block diagram of a control circuit in the preferred embodiment of the height regulation system according to the invention.

FIG. 4 shows the schematically shows circuit construction of the preferred embodiment of the height regulation system. The control unit 22 comprises a microprocessor 100 including an input and output interface 102, an arithmetic circuit 104 and a memory unit 106. The vehicular height sensors 21FL, 21FR, 21RL and 21RR are connected to the input interface 102 via analog-to-digital (A/D) converters 108FL, 108FR, 108RL and 108RR to input vehicular height indicative signals $S_{FL}$, $S_{FR}$, $S_{RL}$ and $S_{RR}$. The lateral acceleration sensor 23a and the longitudinal acceleration sensor 25 are connected to gain amplifiers 110 and 112. The gain amplifier 110 provides a predetermined gain Ky for amplifying the lateral acceleration indicative signal Gy to derive an anti-rolling control signal component as a function of magnitude of the lateral acceleration represented by the lateral acceleration indicative signal. The gain amplifier 112 outputs the anti-rolling control signal component to adders 114FL, 114FR, 114RL and 114RR. As can be seen from FIG. 4, the gain amplifier 110 is connected to non-inverting inputs of the adders 114FR and 114RR and to inverting inputs of the adders 114FL and 114RL. On the other hand, the gain amplifier 112 provides a predetermined gain Kx for amplifying the longitudinal acceleration indicative signal Gx to derive an anti-pitching control signal component as a function of magnitude of the longitudinal acceleration as represented by the longitudinal acceleration indicative signal Gx. The gain amplifier 112 outputs the anti-pitching control signal component to the adders 114FL, 114FR, 114RL and 114RR. The adders 114FL and 114FR receives the anti-pitching control signal component from the gain amplifier 112 via non-inverting inputs and the adders 114RL and 114RR receive the anti-pitching control signal component from the gain amplifier 112 via the inverting inputs.

As can be seen, the polarity of the anti-rolling control signal components supplied to the adders 114FL and 114RL is opposite to that for the adders 114FR and 114RR so that variation fluid pressure in respective of the working chambers in the hydraulic cylinders 26FL, 26FR, 26RL and 26RR is caused to be in the opposite direction at the left and right suspension system for suppressing rolling motion of the vehicular body 10. Similarly, the polarity of the anti-pitching control signal components supplied for the adders 114FL and 114FR is opposite to that for the adders 114RL and 114RR so that variation of the fluid pressure in respective working chambers in the hydraulic cylinders 26FL, 26FR, 26RL and 26RR is opposite at the front and rear suspension systems for suppressing rolling motion of the vehicular body 10. Since the anti-rolling control signal component and the anti-pitching control signal component are combined with each other, the sum derived contains both anti-rolling and anti-pitching control signal components. The output of each adder 114FL, 114FR, 114RL and 114RR thus serves as an attitude change suppressing control signal component.

Outputs of the adders 114FL, 114FR, 114RL and 114RR are connected to non-inverting inputs of adders 116FL, 116FR, 116RL and 116RR to supply the attitude change suppressive control signal component. The adders 116FL, 116FR, 116RL and 116RR each have another non-inverting input connected to the input/output interface 102 of the microprocessor 100 via digital-to-analog (D/A) converters 118FL, 118FR, 118RL and 118RR to receive therefrom analog form height control signal components which are derived by the microprocessor 100 on the basis of the vehicular height indicative signals $S_{FL}$, $S_{FR}$, $S_{RL}$ and $S_{RR}$. The adders 116FL, 116FR, 116RL and 116RR thus derive control signals $I_{FL}$, $I_{FR}$, $I_{RL}$ and $I_{RR}$ in the form of driver current signals. As can be appreciated, the control signals as outputs of respective adders 116FL, 116FR, 116RL and 116RR, are the sum value of the attitude change suppressive control signal components and the height control signal components in order to provide a attitude change suppressive fluid pressure control magnitude and a height adjustment fluid pressure control magnitude.

The outputs of the adders 116FL, 116FR, 116RL and 116RR are respectively connected to the proportioning solenoid assemblies 29 of respective pressure control valve units 28FL, 28FR, 28RL and 28RR for adjusting fluid pressure in the working chambers of the hydraulic cylinders 26FL, 26FR, 26RL and 26RR.

Figure 5:
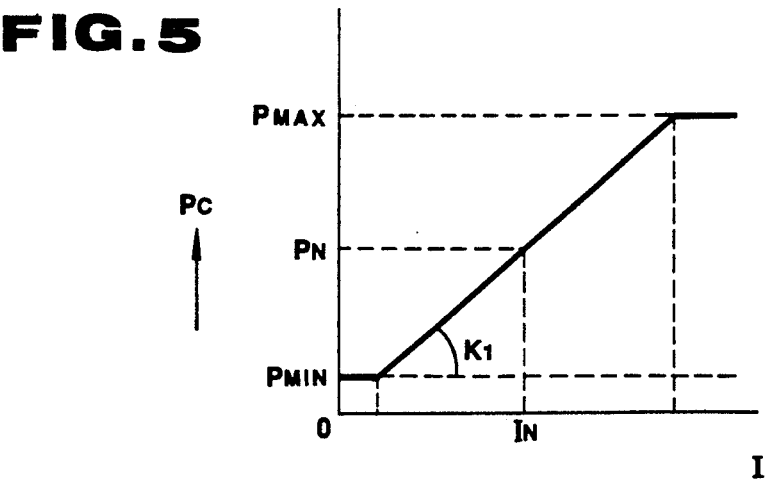
FIG. 5 is a chart showing the relationship between an electric current value of a control signal to be supplied for an actuator of the pressure control valve and a working fluid pressure supplied to a working chamber of a hydraulic cylinder.

Here, the relationship between the current level I represented as the control signal $I_{FL}$, $I_{FR}$, $I_{RL}$ and $I_{RR}$ and the control pressure Pc to be supplied to the working chamber 26d is illustrated in FIG. 5. As can be seen from FIG. 5, the control pressure Pc is varied between a predetermined maximum pressure $P_{MAX}$ corresponding to the rated pressure of the supply line and a predetermined minimum pressure $P_{MIN}$ across a neutral pressure $P_N$ according to variation of the control current level I. The gradient of variation of the fluid pressure relative to variation of the control current level I is defined by a proportioning gain $K_1$.

The operation of the foregoing height control system as applied to the active suspension system will be discussed herebelow.

In the hydraulic circuit set forth above, the fluid is pump 16 driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and is introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via a pilot line 300a. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_O$.

Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to the drop of the pressure in the supply line 35, the pilot pressure to be exerted on the operational one-way check valve 300 via the pilot line 300a drops. When the pressure in the pilot line 300a drops below or equal to the set pressure, the operational one-way check valve 300 is switched into an operational one-way check position to block fluid communication therethrough. As a result, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it does not affect the fluid pressure in the working chamber.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, the path area of which is restricted by the valve head 48a of the poppet valve 48 becomes the neutral value. At this position of the poppet valve 48, the pilot pressure $P_P$ within the pilot chamber PR is maintained at the neutral pressure $P_N$. At this condition, if the fluid pressures of the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when there is relatively high frequency and small magnitude road shock input through the vehicular wheel, it is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as to not be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure $P_P$ in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes a pressure drop at the pressure control port 54c so that the control pressure Pc becomes lower than the pilot pressure $P_P$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set forth, working fluid in the pilot chamber PR is generally introduced through the pilot path PP via the multi-stage orifice Qp and return through the pilot return path PT via the lower section 42Ut of the control chamber 42U and via the multi-stage orifice Pr as long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber is in confluence with the working fluid from the pilot chamber PR, back pressure is produced in the drain port 54r, the fluid flowing through the pilot return path PT is disturbed and thus becomes unstable. This tends to cause provision of the pressurized fluid from the drain port 54r to the pilot chamber PR. In such a case, all of the orifices in the multi-stage orifice Pr are effective to create greater flow restriction that than for the steady flow. This avoids the influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control takes place in response to the lateral acceleration exerted on the vehicle body, the control signal current value is derived on the basis of the magnitude of the lateral acceleration monitored by the lateral acceleration sensor 23a, Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height has risen across the neutral position, is decreased to suppress rising motion of the vehicle body. Therefore, in order to control the pressures in the working chambers 26d of both side hydraulic cylinders 26, control signal current values are increased and decreased across the neutral value $I_N$.

For example, when rolling motion is caused by a left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 20 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, the flow restriction magnitude at respective communication path openings 46A is varied to vary the pilot pressures $P_P$ in the pilot chamber PR. As set forth, since the fluid pressures in the working chambers 26d become equal to the pilot pressures $P_P$, the suspension characteristics at respective hydraulic cylinders 26 can be adjusted.

Anti-pitching, bouncing suppressive suspension control can be performed substantially in the same manner to that discussed with respect to the anti-rolling control.

Figure 6:
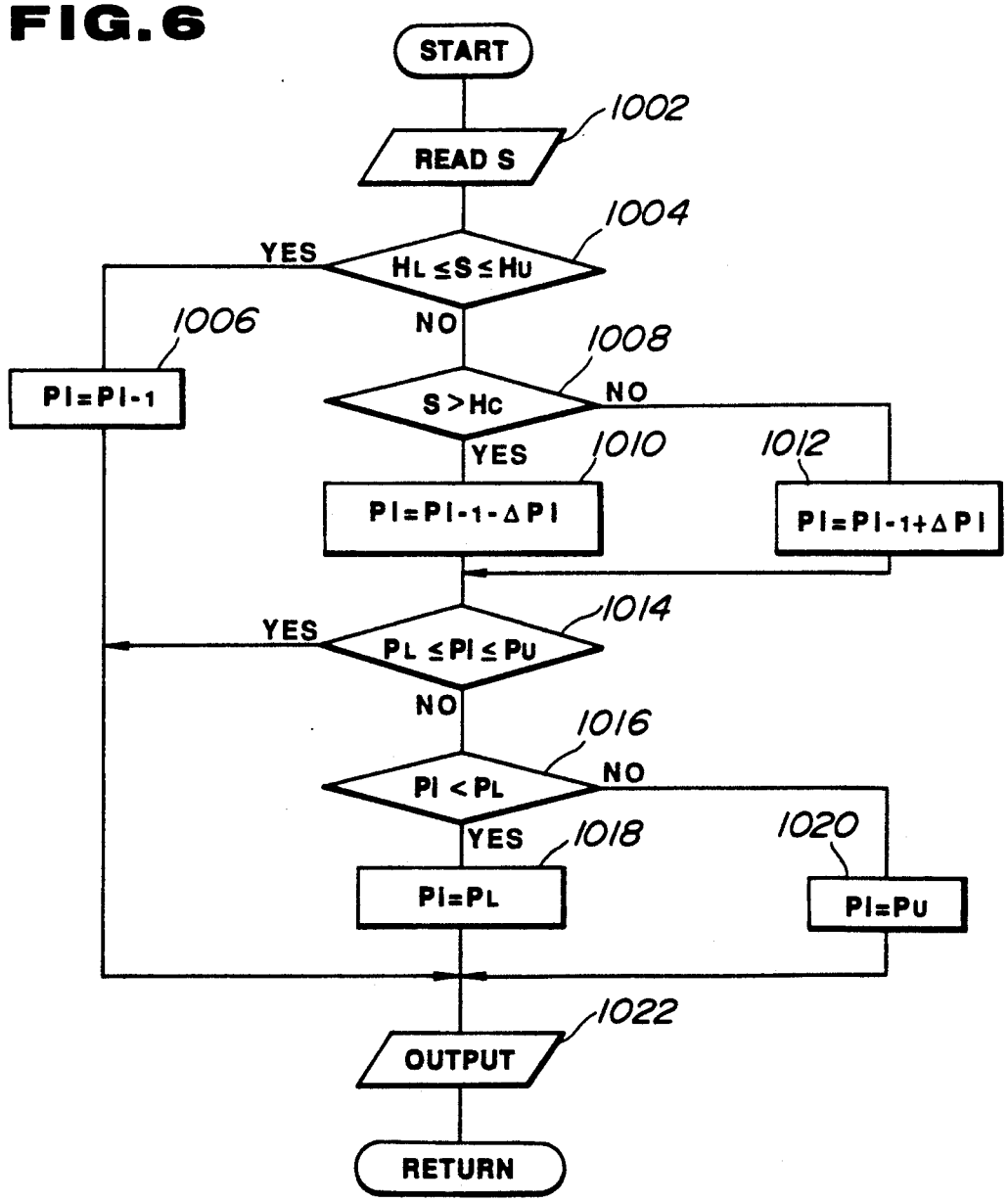
FIG. 6 is a flowchart showing a height control routine to be performed by the control circuit of FIG. 4.

FIG. 6 shows the process for a routine for deriving a height control signal component on the basis the vehicular height indicative signals $S_{FL}$, $S_{FR}$, $S_{RL}$ and $S_{RR}$. The process shown may be programmed as one of a plurality of interrupt routines to be triggered periodically at a predetermined timing, e.g. every 20 msec.

It should be appreciated that the process shown is executed to derive the height control signal component for each of the front-left, front-right, rear-left and rear-right suspension systems. However, in the following discussion, the process is described for deriving singular height control signal component by generally referring to the vehicular height indicative signal by the reference label S.

Immediately after starting execution of the routine shown, the vehicular height indicative signal S is read out at a step 1002. Then, at a step 1004, the vehicular height indicative signal S is compared with an upper vehicular height criterion $H_U$ which defines as allowable maximum height level of the vehicle and with a lower vehicular height criterion $H_L$ which defines allowable minimum height level of the vehicle. The upper and lower vehicular height criteria $H_U$ and $H_L$ define a target vehicular height range. Therefore, the process at the step 1004 is performed to make a judgement as to whether the vehicular height as represented by the vehicular height indicative signal S is maintained within the target vehicular height range or not.

If the vehicular height indicative signal value S, as checked at the step 1004, is smaller than or equal to the upper vehicular height criterion $H_U$ and greater than or equal to the lower vehicular height criterion $H_L$, the process goes to a step 1006. At the step 1006, a target pressure $P_i$ as the height control signal component is set at a value corresponding to the value $P_{i-1}$ derived in the immediately preceding execution cycle. Therefore, the height control signal component is maintained unchanged.

On the other hand, if the vehicular height indicative signal value S as checked at the step 1004, is greater than the upper vehicular height criterion $H_U$ or smaller than the lower vehicular height criterion $H_L$, then process goes to a step 1008.

At the step 1008, the vehicular height indicative signal value S is compared with a target vehicular height value $H_c$ which may be set at a intermediate heights $H_U$ and $H_L$ between the maximum and minimum height of the target vehicular height range. If the vehicular height indicative signal S is greater than the target vehicular height value $H_c$, a judgement can be made that the vehicular height is excessively high to require lowering of the vehicular height. On the other hand, if the vehicular height indicative signal S is smaller than the target vehicular height value $H_c$, judgement can be made that the vehicular height is excessively low requiring an increasing height adjustment. When the former case, i.e. a lowering adjustment is required, the height control signal component $P_i$ is derived by subtracting a predetermined value $\Delta P_i$ from the height control signal component $P_{i-1}$ derived in the immediately preceding execution cycle, at a step 1010. In the later case, i.e. an increasing adjustment is required, the height control signal component $P_i$ is derived by adding the predetermined value $\Delta P_i$ to the height control signal component $P_{i-1}$ derived in the immediately preceding execution cycle at a step 1012. After the process of one of the steps 1010 and 1012, the derived height control signal component $P_i$ is compared with upper and lower limit values $P_U$ and $P_L$ which define an allowable height control signal component value range, at a step 1014. If the height control signal component $P_i$ has a value smaller than the upper limit $P_U$ and greater than the lower limit $P_L$ as checked at the step 1014 a, check is performed whether the height control signal component $P_i$ is smaller than the lower limit $P_L$ at a step 1016. When the height control signal component $P_i$ is smaller than the lower limit value $P_L$, the height control signal component value $P_i$ is modified to be set at the value corresponding to the lower limit value $P_L$ at a step 1018. On the other hand, if the answer at the step 1016 is negative, then the height control signal component $P_i$ is set at a value corresponding to the upper limit value $P_U$ at a step 1020.

After the process at one of the steps 1006, 1018 and 1020 the process goes to a step 1022 to output the vehicular height control signal component to the D/A converters 118FL, 118FR, 118RL and 118RR. Also, when the vehicular height control signal component $P_i$ as checked at the step 1014 is within the predetermined variation range defined by the upper and lower limit values $P_U$ and $P_L$, the process directly goes to the step 1022 to output the vehicular height control signal component as derived at one of the steps 1010 and 1012.

Here, when the vehicle body is suspended by the hydraulic cylinders 26FL, 26FR, 26RL and 26RR and the coil springs 36, the following relationship between a spring loud W (vehicle body), the hydraulic force $F_P$ of the hydraulic cylinder 26 and the spring 36 force $F_K$ of the coil spring can be expressed by:

$$W = F_P + F_K \qquad (1)$$

On the other hand, assuming that the internal fluid pressure in the working chamber 26d is P, the effective area on the piston 26c is A, the spring coefficient of the coil spring is K, and the length of the coil spring is L, the foregoing equation (1) can be modified as:

$$W = P \times A + K \times L \qquad (2)$$

Then, when the force relationship is set to establish the target height $H_c$ when the vehicle body spring load W is in a predetermined standard value and the fluid pressure in the working chamber is at the neutral pressure $P_N$, the vehicular height can be maintained within the target height range even when the vehicle body spring load W is, changed by boarding or unboarding of a passenger or loading or unloading of luggage. For example, if the value W is varied in a magnitude of $\Delta W$ and the fluid pressure P in the working chamber is maintained constant, the force balance can be expressed by:

$$W + \Delta W = P \times A + K(L + \Delta L) \qquad (3)$$

In order to regulate the vehicular height, the $\Delta L$ value is maintained at zero. For this, the fluid pressure P is varied in a magnitude $\Delta P$ for maintaining $\Delta L$ at zero. Then, the foregoing equation (3) is modified as:

$$W + \Delta W = (P + \Delta P)A + K \times L \qquad (4)$$

When taking the above, when the vehicle body spring load W is a minimum $W_L$, i.e. no boarded passenger, no loaded luggage and empty fuel tank and when the vehicle weight is maximum $W_U$ the minimum and maximum fluid pressure $P_L$ and $P_U$ required to maintain $\Delta L$ at zero can be expressed by:

$$P_L = (W_L - K \cdot L)/A \qquad (5)$$

$$P_U = (W_U - K \cdot L)/A \qquad (6)$$

Therefore, the minimum and maximum fluid pressure as the upper and lower limit $P_U$ and $P_L$, can be derived from the foregoing equations (5) and (6).

As can be appreciated herefrom, according to the embodiment shown, since the fluid pressure variation range is set within the pressure range corresponding to the minimum and maximum vehicle weights, excess adjustment of the fluid pressure can be successfully prevented.

Therefore, the invention fulfills all of the objects and advantages sought therefore.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the embodiments shown which can be embodied without departing from the principle of the invention set out in the appended claims.

What is claimed is:

1. A vehicular height regulation system comprising: height adjusting means disposed between a vehicular body and a vehicular wheel for adjusting a relative distance therebetween, said height adjusting means including a variable pressure chamber filled with a working fluid having variable pressure;
pressure adjusting means for adjusting fluid pressure within said variable pressure chamber for varying said relative distance between said vehicular body and said vehicular wheel;
sensor means for monitoring said relative distance between said vehicular wheel to produce a sensor signal value representative of a monitored relative distance;
control means for deriving a control signal on the basis of said sensor signal value to control operation of said pressure adjusting means for maintaining said relative distance between said vehicular body and said vehicular wheel within a predetermined distance range, said control means limiting a variation range of said fluid pressure within said variable pressure chamber within said predetermined pressure range.

2. A vehicular height regulation system as set forth in claim 1, wherein said predetermined distance range is set with respect to a predetermined target vehicular height and said predetermined pressure range is defined by a lower pressure limit corresponding to fluid pressure required for maintaining said relative distance for establishing said target height at a minimum load condition of said vehicular body and an upper pressure limit corresponding to fluid pressure required for maintaining said relative distance for establishing said target height at a maximum load condition of said vehicular body.

3. A vehicular height regulating system for an automotive vehicle, comprising:
a) first means, including a plurality of hydraulic pressure actuators, each hydraulic pressure actuator of said hydraulic pressure actuators being installed between a vehicular body and a corresponding road wheel supporting member of a plurality of road wheel supporting members, for varying a relative distance between said vehicular body and said corresponding road wheel supporting member according to a working hydraulic pressure applied to said each hydraulic pressure actuator;
b) pressure control valve means for controlling said working hydraulic pressure applied to said each hydraulic pressure actuator according to a value of a command signal input to said pressure control valve means;
c) sensor means for detecting said relative distance between said vehicular body and said corresponding road wheel supporting member;
d) first control means for providing said command signal for said pressure control valve means, said command signal having a value varied according to said relative distance to provide an appropriate vehicular height, said first control means determining whether said relative distance falls within a predetermined controllable range and providing said command signal for said pressure control valve means so that said relative distance is adjusted to fall within said predetermined controllable range when it is determined that said relative distance does not fall within said predetermined controllable range; and
second control means for providing both maximum and minimum limits for said value of said command signal so that said working hydraulic pressure applied to said each hydraulic pressure actuator falls within a predetermined pressure range defined by said maximum and minimum limits.

4. A vehicular height regulation system as set forth in claim 3, wherein said first means includes a coil spring interposed between said vehicular body and said corresponding supporting member in parallel to said each hydraulic pressure actuator, wherein a minimum limit value $P_L$ of said working hydraulic pressure is expressed by the following equation:

$$P_L = (W_L - K \times L)/A,$$

wherein $W_L$ denotes a lowest vehicular weight of a spring load, K denotes a spring constant of said coil spring, L denotes a length of said coil spring, and A denotes a pressure receiving area of a piston of said each hydraulic pressure actuator,
and wherein a maximum limit value $P_U$ of said working hydraulic pressure is expressed by the following equation:

$$P_U = (W_U - K \times L)/A,$$

wherein $W_U$ denotes an upper vehicular weight of said spring load.

5. A vehicular height regulation system as set forth in claim 4, which further includes:

lateral acceleration sensing means for detecting a lateral acceleration of said vehicle; and
longitudinal acceleration sensing means for detecting a longitudinal acceleration of said vehicle;
wherein each of said hydraulic pressure actuators and said coil spring is installed for each of front-left, front-right, rear-left, and rear-right road wheel supporting members; and
wherein said command signal has a value of current level supplied to a corresponding pressure valve means, said value of current level being a sum of values of currents derived on the basis of corresponding additional sensing means installed between said vehicular body and a corresponding wheel supporting member and said lateral and longitudinal acceleration sensors.

6. A vehicular height regulation system as set forth in claim 5, wherein said lowest vehicular weight of spring load $W_L$ is defined as a no occupant, no luggage, and empty fuel tank state and said upper vehicular weight of spring load $W_U$ is defined as a maximum number of occupants, full luggage, and filled fuel tank state.

* * * * *